Oct. 23, 1951 A. VON HIPPEL ET AL 2,572,079

RADIATION-SENSITIVE CELLS AND METHOD OF MAKING SAME

Filed March 13, 1947

INVENTORS
ARTHUR VON HIPPEL
MORTIMER C. BLOOM
JAMES H. SCHULMANN

BY Thomas H. Heyden

ATTORNEY

Patented Oct. 23, 1951 2,572,079

UNITED STATES PATENT OFFICE 2,572,079

RADIATION-SENSITIVE CELLS AND METHOD OF MAKING SAME

Arthur von Hippel, Weston, and Mortimer C. Bloom, Newton Highlands, Mass., and James H. Schulman, Washington, D. C., assignors to Federal Telephone and Radio Corporation, New York, N. Y., a corporation of Delaware Application March 13, 1947, Serial No. 734,530

17 Claims. (Cl. 136—89)

This invention relates generally to improvements in radiation sensitive devices and in particular it is concerned with a novel selenium type cell having unusual sensitivity in the visible region of the spectrum, together with a process for manufacturing such cells. This application is a continuation-in-part of a now abandoned application, Serial Number 448,260, filed on June 24, 1942, by the same applicants.

It has long been known that elemental selenium, when exposed to light of varying intensity can be used to produce a correspondingly varying voltage or electrical resistance, thereby permitting use of selenium cells in many of the now common photo cell applications. Among the disadvantages of some common types of selenium photo cells are lack of sensitivity to light in the visible portion of the spectrum and instability of photo-response, accordingly much attention has been directed toward improving the sensitivity and stability of these cells. This invention is addressed to such improvements.

In accordance with the present invention a novel hypersensitive and stable selenium cell is provided wherein at least a portion of the selenium surface exposed to radiation is unusually sensitive to and readily absorbs radiation within at least the visible region of the spectrum, and this sensitivity is substantially constant throughout the useful life of the device.

In addition to the high degree of photo-sensitivity exhibited by the cells in accordance with this invention they possess the further advantage that these cells are relatively rugged and are unaffected by surrounding atmospheric conditions, thus permitting satisfactory use under adverse weather conditions or in a corrosive atmosphere.

Further advantages of these cells are simplicity of construction with corresponding ease of manufacture, reliability over long periods of use and reproducibility within reasonable standards under usual manufacturing conditions. Other advantages possessed by cells according to this invention will be apparent hereinafter.

Regarded in certain of its broader aspects, the process for manufacturing cells according to this invention includes an activation step that comprises electrolyzing an acidic aqueous electrolyte, using an inert anode and, as the cathode, the element that is the cathode of the photocell, said element being coated with selenium on its active surface, preferably prior to but in some instances during the electrolysis, this activation electrolysis being conducted at such conditions of current and voltage as are of a magnitude sufficient to produce polarization effects, but not under conditions of higher magnitude such that said polarization effects disappear.

By the term polarization as herein employed is meant the increase in electrical resistance of the cell upon passage of current therethrough. For example, under polarizing conditions at constant voltage the current passing through the cell will progressively diminish reflecting this increase in cell resistance, or conversely at constant current the voltage will increase.

Typical radiation sensitive cells embodying the principles of this invention are illustrated in the accompanying drawings, wherein.

Figure 1:
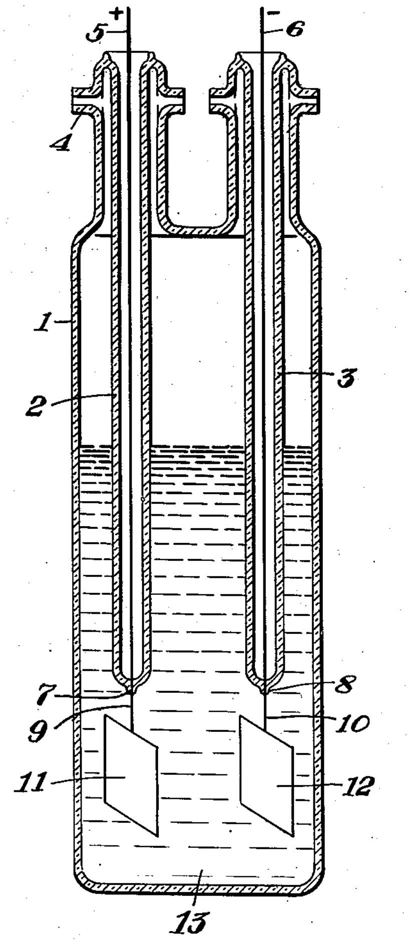
Fig. 1 is a vertical sectional view of a wet selenium cell in accordance with this invention.

Referring to the drawing, Fig. 1 illustrates a wet cell containing a cathode with a hypersensitive surface according to this invention. The envelope of the cell is a glass vessel 1, generally cylindrical in shape, provided with a pair of re-entrant tubular elements 2 and 3 depending from the top of the cell having vents 4 formed therein adapted to permit escape of gas from the cell. Wire leads 5 and 6 are mounted in the re-entrant elements 2 and 3 respectively and are sealed thereto at 7 and 8 respectively. The anode 11 mounted on lead 9 is formed of a suitable electrically conducting substance which is non-reactive with selenium, such as platinum, gold, carbon or palladium, or possibly nickel, as also are the ends of the leads 9 and 10 which are to be immersed in the electrolyte. The cathode 12, mounted on lead 8, is formed of a similar substance as that from which the anode is made and is provided with a surface hypersensitive to radia- as hereinafter described, and the electrolyte 13 is provided in the cell envelope in sufficient quantity to cause immersion therein of both cathode and anode.

Figure 2:
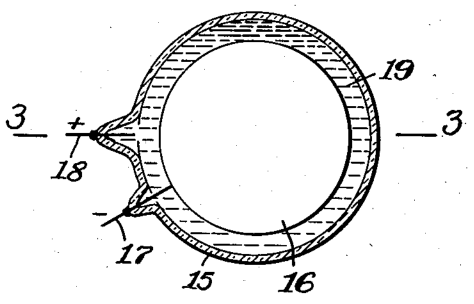
Fig. 2 is a transverse cross-sectional view of an alternative form of cell according to this invention.
Figure 3:
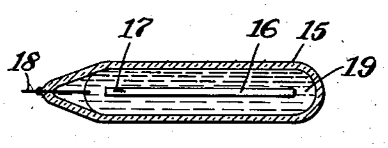
Fig. 3 is a horizontal cross-sectional view along the line 3—3 of the cell in Fig. 2.

Figs. 2 and 3 illustrate an alternative form of cell according to this invention. The watch-shaped glass vessel 15 has in it a disc-like cathode 16 mounted on a suitable rod 17 which is sealed in the glass envelope as shown and serves as the cathode lead. The anode 18 is formed of platinum and is sealed through the glass as shown. The electrolyte 19 is an aqueous acid solution as will be hereinafter described.

The photo-electric effect of the cells hereinabove described may be obtained in well known manner by directing radiation against the cathode surface in the cell, which is a reason why the cell envelope should be formed of a radiation-transparent material such as glass, quartz or the like. Two electrical effects can be observed: (1) the electrical resistance decreases with increased radiation intensity; and (2) the radiation produces in the cell an E. M. F. or a change in E. M. F. These effects produced by cells embodying the principles of this invention are exceptionally pronounced.

Figure 4:
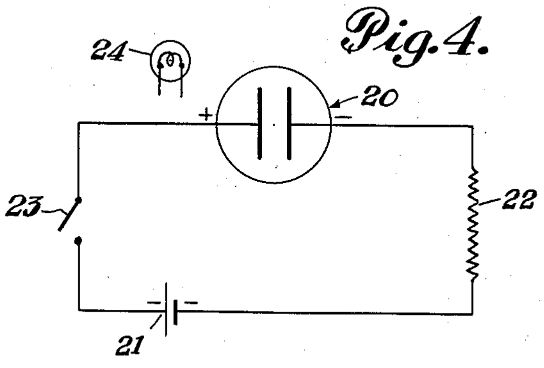
Fig. 4 is a diagram of a circuit in which the photo-electric effect of these cells can be observed.

Fig. 4 is a diagrammatic illustration of a circuit in which these photo-electric effects may be utilized. The cell 20, which may be any of those hereinabove described, is connected to a source of D. C. voltage 21, such as a small battery which may be of about two volts, through a resistance 22 and a switch 23. When the circuit is completed by closing the switch 23, the current passing through the resistance 22 changes in accordance with changes of radiation intensity applied to the cell from source 24.

The electrolyte used with a coated cathode in the activation electrolysis can be any aqueous acidic solution hereinafter specified which does not chemically attack the electrodes or the cell envelope. The concentration of the acid component to be used in the electrolyte is dependent upon the conditions of electrolysis as will be explained below. Among the aqueous solutions which have been found satisfactory for this purpose are those of selenious acid, which is merely an aqueous solution of selenium dioxide, and also the common mineral acids such as sulphuric acid, hydrochloric acid, nitric acid, phosphoric acid or the like, of which selenious acid is preferred. For reasons that will be evident, it is preferred that the electrolyte contain, in every instance, at least a minor amount of selenium dioxide, if desired, aqueous solutions of salts having an acidic reaction may also be used in the electrolyte provided of course, that the salts do not introduce into the electrolyte any cation, excepting hydrogen, having a discharge potential lower than the potential at which the electrolysis is performed.

The temperature at which the activation electrolysis is performed with a coated cathode is not a critical factor materially affecting the results except in instances where the electrolyte contains a large concentration of highly ionized acid, say above about one normal; it has been found with these exceptions that the desired effects can be obtained by electrolysis at room temperature or at higher temperature, for example about 100° C. In those instances where the electrolyte contains large concentrations of highly ionized acid, the activation electrolysis is performed at any temperature above freezing point of the electrolyte and below about 50° C.

It has been mentioned above that the cathode used in the electrolysis is that portion of the finished cell which is to be the radiation sensitive component, and that this cathode 12 is coated with selenium, either prior to or during the electrolysis. It is to be understood that the controlling factor here is the presence of a selenium surface on the cathode, thus the terms as herein used include an electrode structure formed wholly of selenium, although for practical reasons this is rarely desirable, and also include composite electrodes consisting of an electrically conductive supporting structure bearing a selenium coating. Among the electrical conductors which can be used for this purpose the inert metals, e. g. the noble metals, tantalum, columbium, tungsten, molybdenum, stainless steel and the like, and carbon (graphite) are preferred although non-inert metals such as iron, nickel and the like can be used provided the selenium coating protects the metal from attack by the cell electrolyte.

In instances where the selenium coating is provided on the cathode element prior to the activation electrolysis, it can be formed on the metallic surface of the element by any of the methods commonly employed for this purpose in selenium rectifier manufacture, or it can be produced by electrodeposition as will be hereinafter described, the last being the preferred procedure. Irrespective of which process is used, the primary object is to produce an adherent coating and this can be facilitated, when other than inert metals are used, by forming a superficial coating of metal selenide on the surface prior to coating with selenium. For example, an iron or nickel electrode can be treated with an aqueous solution of selenium dioxide, thereby causing formation of an adherent superficial layer that effectively promotes bonding of the metal to a subsequently applied selenium coating, whether it is applied by flowing molten selenium on the treated surface or applied by electrodeposition.

It is preferred that the selenium coating be produced by electrodeposition as experience indicates this type of coating possesses high light absorption, due at least in part to its low reflectivity which in some instances is about 4% with resultant high photo sensitivity. When so prepared as hereinafter described, the coating is gray metallic selenium having the appearance of black velvet—due to the nap or pile of filamentary crystallites orientated substantially normal to the electrode surface. This coating without being activated is radiation-sensitive, however, cells utilizing electrodes of this type after activation have a steady sensitivity of about 1000 microamperes per lumen, maintained substantially constant over the useful life of the cell whether the cell is kept on voltage in the dark or stored on voltage under intense light over long periods of time.

A gray metallic selenium coated electrode of the preferred type can be made pursuant to the disclosure of copending application Serial No. 731,834, now Patent No. 2, 568,780, issued September 25, 1951, filed March 1, 1948, by Arthur R. von Hippel and Mortimer C. Bloom. In accordance with the teachings of this application the coating is produced on the electrode as follows: The selected metallic element is carefully cleaned by methods known in the electroplating art, e. g., solvent degreasing, soaking or electrolytic treatment in alkaline cleaners, pickling, etc., and the cleaned element after rinsing is then made the cathode in electrolysis of an aqueous acidified electrolyte containing highly purified selenium dioxide. The relative proportions of the electrolyte components are dependent upon the current density to be used in the electrolysis; in general, for operation at high current densities (e. g. 100 amperes per square foot), high concentrations of selenium dioxide and acid in the electrolyte are desirable, whereas both concentrations may be progressively reduced as the current density used is diminished. For purposes of illustration, but subject to modification as aforesaid, an electrolyte suitable for use at a current density of about 100 amperes per square foot of cathode surface would comprise about 1225 grams highly purified dioxide, about 370 grams of water and about 677 grams of concentrated sulphuric acid. Using an anode inert to the electrolyte, the electrolysis is performed at approximately 100° C. and a coating of satisfactory thickness is obtained after a few minutes. The coated electrode is then removed from the electrolyte and washed.

A radiation-sensitive cell embodying the principles of this invention wherein a coated cathode is used includes an envelope formed of a material capable of transmitting radiation and containing electrolyte in which the coated cathode and anode are at least partially immersed. The anode can be fabricated from any electrical conductor inert to the electrolyte under cell operating conditions. The cell electrolyte is an acidic aqueous solution as above specified in the description of the activation electrolysis and preferably is an aqueous solution containing about 10% selenium dioxide based on total weight. Use of this electrolyte results in the advantages that any minor amounts of selenium dissolved from the cathode surface during activation or operation of the cell are replaced from the selenium dioxide solution. If desired the conductivity of the cell can be increased by adding a mineral acid or more selenium dioxide to the electrolyte, thereby permitting electrolytic activation using a high current density, however as the cell conductivity is altered it will be obvious that the cell dark current will also be modified in the same sense.

After the cell comprising a coated cathode has been assembled as above described, it is activated for use by connecting the electrodes to an electrical potential source and the electrolyte is electrolyzed, preferably at or above the voltage at which the cell is subsequently to be operated. The electrolysis is continued until observation indicates the current flowing through the cell has diminished from its initial magnitude to a substantially stable value. The voltage employed, both in activation of the cell and in its subsequent operation, must not be of a magnitude such that the current flowing through the cell, under the initial conditions for activation, fails to diminish with time.

If an inert uncoated instead of the coated cathode is incorporated in a cell according to this invention, the electrolyte to be used is an aqueous solution of selenium dioxide which may, although not necessarily, contain a minor amount not exceeding about one normal of a highly ionized mineral acid of the type aforementioned. The proportion of selenium dioxide in the electrolyte is not critical; sufficient must be used to afford the desired cell conductivity and amounts including as much as 80% selenium dioxide based on weight of electrolyte may be used. After the cell has been assembled and the electrodes immersed in the electrolyte, it is illuminated and a potential, depending upon the electrolyte composition, is applied to the electrodes while maintaining the cell at a temperature exceeding about 55° C. but not more than about 120° C., causing a cathodic deposit which initially is red selenium and thereafter is the desired gray metallic crystalline selenium. The voltage used in this electrolysis should not be so high that excessive hydrogen evolution causes stripping of the initial selenium deposit nor should the voltage used be so low that the rate of selenium deposition is undesirably low. Under these conditions, the formation of the selenium deposit on the cathode and the activation of the deposit occur simultaneously and due to this fact the electrical resistance of the cell rapidly increases as the electrolysis continues necessitating continuous increase in the applied voltage in order to maintain adequate rate of deposition. The electrolysis is discontinued following observation of polarization effects after formation of the gray metallic crystalline deposit and the cell is then ready for use. If the deposition operation is not conducted under illumination, the cell is thereafter connected to a potential source equal to that to be used in operation and then illuminated until the cell sensitivity and dark current become stable.

It is believed that the remarkably hypersensitive selenium surfaces obtainable by the activation process according to this invention either are due to reaction of the selenium with nascent hydrogen formed at the cathode surface during the electrolytic activation treatment, or are due to adsorption of the hydrogen on the selenium surface.

Having thus described the present invention including illustrative but non-limitative embodiments thereof, what it is desired to secure by Letters Patent is:

1. In a radiation sensitive device of the wet cell type, an electrode having a black velvet-like radiation sensitive coating that comprises microscopic electrodeposited selenium crystallites, said coating having been activated by treatment with electrolytically generated nascent hydrogen.

2. In a radiation sensitive device of the wet cell type, an electrode with a radiation sensitive surface comprising a black velvet-like coating of microscopic electrodeposited metallic selenium crystallites having a reflectivity of less than about 5%, said coating having been activated by treatment with electrolytically generated nascent hydrogen.

3. A radiation sensitive device that comprises an anode and a cathode, an envelope surrounding said anode and cathode, an electrolyte in said envelope in contact with said anode and cathode, and a black velvet-like coating comprising microscopic electrodeposited metallic selenium crystallites on said cathode, said coating having been activated by treatment with electrolytically generated nascent hydrogen.

4. A radiation sensitive device that comprises an anode and a cathode, an envelope surrounding said anode and cathode, an electrolyte in said envelope in contact with said anode and cathode, and a black velvet-like coating comprising microscopic electrodeposited metallic selenium crystallites on said cathode having a reflectivity of less than about 5%, said coating having been activated by treatment with electrolytically generated nascent hydrogen.

5. A radiation sensitive device that comprises an anode and a cathode, an envelope surrounding said anode and cathode, and electrolyte comprising selenious acid in said envelope in contact with said anode and cathode, and a black velvet-like coating comprising microscopic electrodeposited metallic selenium crystallites on said cathode, said coating having been activated by treatment with electrolytically generated nascent hydrogen.

6. In a radiation sensitive device, an element having an electrodeposited selenium surface adapted to being exposed to radiation, the improvement that comprises a coating on said surface comprising the product obtained when selenium is treated with nascent hydrogen.

7. A selenium photo-cell comprising a selenium element having a sensitive surface comprising the product obtained when selenium is treated with nascent hydrogen in an aqueous electrolyte comprising selenious acid.

8. A photosensitive cell that comprises an at least partially transparent envelope, an anode and a cathode mounted within said envelope, an aqueous acidic electrolyte in said envelope in contact with said anode and said cathode, and an electrodeposited selenium coating upon said cathode bearing a photosensitive layer formed by electrolysis of the electrolyte whereby nascent hydrogen is evolved at the cathode.

9. A wet selenium cell comprising an envelope having a transparent wall, an electrode in the envelope, an electrodeposited selenium coating on the electrode having a photosensitive surface aligned with said wall in position to receive light passing through the wall, an electrolyte in the envelope covering said photosensitive selenium surface, said electrolyte being capable of releasing nascent hydrogen at the selenium surface during electrolysis, a cathode connection to the electrode and an anode in the electrolyte and a layer upon the photosensitive selenium surface formed by such electrolysis of the electrolyte.

10. A cell as set forth in claim 9, in which the electrolyte contains selenious acid.

11. In a radiation sensitive device of the wet cell type, the improvements that comprise an electrode, a radiation sensitive surface on said electrode consisting of a black velvet-like coating comprising microscopic electrodeposited metallic selenium crystallites, and on said coating the product obtained when selenium is treated with nascent hydrogen.

12. A radiation sensitive device that comprises an anode and a cathode, an envelope surrounding said anode and cathode, an electrolyte in said envelope in contact with said anode and cathode, a black velvet-like coating of microscopic electrodeposited metallic selenium crystallites on said cathode, and on said coating the product obtained when selenium is treated with nascent hydrogen.

13. A radiation sensitive device that comprises an anode and a cathode, an envelope surrounding said anode and cathode, an electrolyte in said envelope in contact with said anode and cathode, a black velvet-like coating of microscopic electrodeposited metallic selenium crystallites on said cathode having a reflectivity of less than about 5%, and on said coating the product obtained when selenium is treated with nascent hydrogen.

14. A radiation sensitive device that comprises an anode and a cathode, an envelope surrounding said anode and cathode, and an electrolyte comprising an aqueous solution of selenious acid in said envelope in contact with said anode and cathode, a black velvet-like coating of microscopic electrodeposited metallic selenium crystallites on said cathode, and on said coating the product obtained when selenium is treated with nascent hydrogen.

15. The process for augmenting the photosensitivity of an electrodeposited selenium coated conducting element of a selenium photocell that comprises immersing said element in an acidic electrolyte, making said element a cathode by the application of direct voltage and electrolyzing while maintaining polarizing conditions.

16. The method for augmenting the photosensitivity of a photosensitive electrodeposited selenium surface comprising subjecting said surface to the action of nascent hydrogen electrolytically released at said surface.

17. The method for augmenting the photosensitivity of a photosensitive electrodeposited selenium coated surface that comprises immersing the selenium coated element in an acidic electrolyte, connecting the element as a cathode and electrolyzing, whereby nascent hydrogen is formed at the cathode.

ARTHUR von HIPPEL.
MORTIMER C. BLOOM.
JAMES H. SCHULMAN.

REFERENCES CITED

The following references are of record in the file of this patent:

UNITED STATES PATENTS

| Number | Name | Date |
|---|---|---|
| 1,108,638 | Stille | Aug. 25, 1914 |
| 1,697,451 | Baird | Jan. 1, 1929 |
| 1,941,493 | Ruben | Jan. 2, 1934 |
| 2,391,706 | Jackson et al. | Dec. 25, 1945 |
| 2,392,003 | Sarver | Jan. 1, 1946 |
| 2,414,438 | Bloom | Jan. 21, 1947 |

FOREIGN PATENTS

| Number | Country | Date |
|---|---|---|
| 525,664 | Germany | May 27, 1931 |

OTHER REFERENCES

Fink et al., Trans. Electrochemical Socy., vol. 66 (1934), pages 286–7.